United States Patent
Frumkin et al.

(10) Patent No.: US 9,477,043 B2
(45) Date of Patent: Oct. 25, 2016

(54) MULTI-TAPER OPTICAL COUPLER

(75) Inventors: Ted Frumkin, Herzliya (IL); Zeev Zalevsky, Rosh HaAyin (IL)

(73) Assignee: Ted Frumkin, Herzliya (IL)

( * ) Notice: Subject to any disclaimer, the term of this patent is extended or adjusted under 35 U.S.C. 154(b) by 0 days.

(21) Appl. No.: 13/500,308

(22) PCT Filed: Apr. 4, 2012

(86) PCT No.: PCT/IB2012/051662
§ 371 (c)(1),
(2), (4) Date: Apr. 5, 2012

(87) PCT Pub. No.: WO2013/150337
PCT Pub. Date: Oct. 10, 2013

(65) Prior Publication Data
US 2015/0286002 A1    Oct. 8, 2015

(51) Int. Cl.
G02B 6/26    (2006.01)
G02B 6/42    (2006.01)
G02B 6/122    (2006.01)
G02B 6/30    (2006.01)

(52) U.S. Cl.
CPC ............. *G02B 6/262* (2013.01); *G02B 6/1228* (2013.01); *G02B 6/305* (2013.01)

(58) Field of Classification Search
CPC ..... G02B 6/262; G02B 6/305; G02B 6/1228
USPC ......................................................... 385/43
See application file for complete search history.

(56) References Cited

U.S. PATENT DOCUMENTS

2006/0204175 A1*  9/2006  Laurent-Lund ...... G02B 6/1228
                                                                    385/43

\* cited by examiner

*Primary Examiner* — Jerry Blevins
(74) *Attorney, Agent, or Firm* — Mark M. Friedman

(57) ABSTRACT

An optical coupler includes a plurality of tapers, each of the taper-bases arranged substantially in a first plane to form a base of the optical coupler for connecting to a first optical waveguide, and the taper-tips arranged substantially non-overlapping in a second plane corresponding to a coupling facet for coupling with a second optical waveguide. This multi-taper coupler overcomes the energy loss of conventional techniques, allowing optical coupling between a variety of optical devices including optical fibers, waveguides, diodes, and switches. The multi-taper has increased information transmission efficiency, reduced loss of signal strength between coupled products, and is more robust to damage of the coupler, and the coupling area is larger than conventional couplers thereby reducing coupling complexity and increasing coupling probability.

13 Claims, 12 Drawing Sheets

MULTI-TAPER OPTICAL COUPLER

FIELD OF THE INVENTION

The present invention generally relates to all optical devices that transmit and/or receive optical energy, and in particular, it concerns coupling between optical devices.

BACKGROUND OF THE INVENTION

In a world of constantly increasing rate of information transmission, reduction of transmission cost and increased efficiency are important. Notwithstanding the advantages of optical information (i.e. the speed of the information transmission and low manufacturing cost), optical transmission is still not as dominant as the electrical information transmission through the communication world. A key reason for the continued use of electrical over optical communication is the loss of energy at the coupling between the optical devices (such as diodes, optical fibers, and waveguides).

Coupling between optical devices, such as between optical fibers (simply referred to in the field as fibers) and waveguides, is a difficult problem in the sense of the obtainable energetic efficiency, in other words reducing loss of signal strength between coupled products. One conventional technique used to couple between optical devices is coupling facet to facet, for example, where a facet of a waveguide is coupled directly with a facet of a fiber. Referring to FIG. 1A, a diagram of coupling using a funnel, a waveguide 102 with width. W has a funnel coupler 104 (simply referred to in this document as a "funnel"). Note, the transition from the waveguide 102 to the funnel 104 is shown as funnel base 108, a construction line used for reference purposes. The facet of the funnel used for coupling to another optical device, such as fiber 106 is shown as funnel facet 109, and is also referred to in industry as the "coupling area". The funnel shaped coupling area has the advantage of a large coupling area at funnel facet 109 to receive a transmission from fiber 106. The funnel 104 and corresponding funnel facet 109 can be made as big as necessary for the particular application. This technique of using a funnel has disadvantages, including a high loss of efficiency due to mode-size and effective index mismatch at the funnel facet 109 of the funnel coupler 104 and the fiber 106.

Referring to FIG. 1B, a diagram of coupling using tapering, a waveguide 102 with width W includes a tapered coupler 114. Similar to the above description of using a funnel, the transition from the waveguide area 102 to the tapered coupler 114 is shown as taper base 118. The facet of the taper used for coupling is shown as taper facet 119, the coupling area for tapered coupler 114. The coupler is typically made as part of the waveguide 102, of high-index contrast material, and may be connected with a short taper with a nanometer-sized tip. Typically, nanometer-sized tips are on waveguides. Tapered tips of fibers are in the range of 0.5-5 µm in width. Tapers for diodes are typically on the same scale as fibers. The taper shaped coupling area has advantages including being more energetically efficient than the funnel technique, and of effectively doing the required mode conversion. This technique of using a taper has disadvantages, including a small coupling area (the nanometer-sized tip) which is difficult to couple to fiber 116, and the small tip that can easily be damaged.

A typical application is to couple waveguide 102 to a single-mode optical fiber (106, 116). Waveguide 102 is typically fabricated on an integrated circuit (chip) and is coupled "off-chip" to other optical devices, such as optical fibers (106, 116). The fiber (106, 116) is typically tapered from being the width of the fiber (portions 106A, 116A, for example core dimensions of 8 to 10.5 µm in width) to a smaller diameter (tapered portions 106B, 116B, for example about 3 µm in width) as appropriate for the application and specific coupler (104, 114) being used.

High refractive index material allows the fabrication of sub-micrometer-sized structures such as waveguides. Coupling to and from devices such as waveguides, fibers, diodes, and optical switches, usually involves high losses due to mode-size and effective index mismatch, for example, between an optical fiber and the waveguide structure, which induces coupling to radiation modes and back-reflection. The fiber (106, 116) typically has a tapered edge such that at the tip the field distribution matches better to the mode field profile obtained at the edge of the nanometer waveguide tip (becomes the field at the edge of the coupler tip delocalized from the waveguide core). The delocalization of the mode field profile at the edge of the nano-tip increases the mode overlap with the optical fiber mode.

An example waveguide has height H=220 nm (the height of the silicon on the silicon on insulator (SOL)) and width W=450 nm, in order to achieve a single-mode operation. To convert the low-confined local mode at the nano-taper tip into the high-confined waveguide mode, a short tapered transition is employed by gradually varying both sidewalk in a symmetric parabolic transition towards the final waveguide width. The coupler losses are ultimately governed by the mode mismatch loss between the mode at the nano-taper tip facet and the one at the edge of the tapered fiber.

There is therefore a need for an improved optical coupler over conventional techniques, allowing optical coupling between a variety of optical conductors, with increased obtainable energetic efficiency, reducing loss of signal strength between coupled products, and being more robust to damage of the coupler.

SUMMARY

According to the teachings of the present embodiment there is provided an optical coupler including: a plurality of tapers, each of the tapers having a taper-base and taper-tip, the taper-bases arranged substantially in a first plane to form a base of the optical coupler for connecting to a first optical waveguide, and the taper-tips arranged substantially non-overlapping in a second plane corresponding to a coupling facet for coupling with a second optical waveguide, wherein the first and second optical waveguides transmit and/or receive optical energy.

In an optional embodiment, the base is operationally connected to the first optical waveguide. In another optional embodiment, the first optical waveguide is selected from the group consisting of: an optical fiber; a silicon on insulator (SOI) waveguide; a diode; and an optical switch. In another optional embodiment, the second optical waveguide is the sun and the first optical waveguide is an solar cell. In another optional embodiment, the taper-bases are substantially exactly overlapping. In another optional embodiment, the taper-bases are substantially non-overlapping. In another optional embodiment, each of the tapers is configured to convert adiabatically between a first propagation mode of an optical signal at the taper-base and a second propagation mode of the optical signal at the taper-tip. In another optional embodiment, the optical coupler is configured to convert adiabatically between a first propagation mode of an optical signal at the base and a second propagation mode of the optical signal at the coupling facet. In another optional embodiment, the optical coupler includes between three and eleven tapers. In another optional embodiment, the multi-taper portion includes a multitude of tapered tips. In another optional embodiment, the second optical waveguide is selected from the group consisting of: an optical fiber; a silicon on insulator (SOI) waveguide; and a diode; and an optical switch.

According to the teachings of the present embodiment there is provided a method for optically coupling between a first optical waveguide and a second optical waveguide, the method including the steps of: providing optical coupler including a plurality of tapers, each of the tapers having a taper-base and taper-tip, the taper-bases arranged substantially in a first plane to form a base of the optical coupler for connecting to a first optical waveguide, and the taper-tips arranged substantially non-overlapping in a second plane corresponding to a coupling facet for coupling with a second optical waveguide; connecting operationally the base to the first optical waveguide; and connecting operationally the coupling facet to the second optical waveguide.

DETAILED DESCRIPTION

The principles and operation of the apparatus and method according to a present embodiment may be better understood with reference to the drawings and the accompanying description. A present invention is an apparatus for optical coupling. The apparatus facilitates coupling between optical devices, using an innovative multi-taper. The multi-taper coupler overcomes the energy loss of conventional techniques, allowing optical coupling between a variety of optical devices including, but not limited to optical fibers, waveguides, diodes, optical switches, and solar cells. The multi-taper has increased obtainable energetic efficiency, reducing loss of signal strength between coupled products, and being more robust to damage of the coupler than conventional techniques and apparatus for coupling between optical devices. By adding multiple tapers to an optical waveguide at an area where the optical waveguide is coupled to another optical waveguide (the coupling facet(s)) information transmission efficiency is increased, coupling area is larger than conventional couplers thereby reducing coupling complexity and increasing coupling probability. The multi-taper enables optical receivers, including solar cells (for example, photovoltaic cells or photoelectric cells) to receive (or in the case of solar cells, collect) optical energy with increased efficiency, as compared to conventional techniques. In addition, if some of the multiple tapers are damaged (for example breaking or being cut during manufacturing or deployment), the remaining tapers facilitate continued high efficiency coupling. This multi-taper coupler can be used in a variety of applications, and is particularly applicable to applications where optical devices on an integrated circuit (chip) need to be coupled to "off-chip" optical fibers. Experimental results show an increase in gain of 2.41 dB using the multi-taper of 7 tips, as compared to using a taper with a single tip.

Current research in the field is focused on improving the conventional use of funnel and single taper techniques, described above. Efforts that are being made include improving facet preparation on SOI waveguides, improving alignment of the coupling facets of tapers, increasing and/or decreasing the coupling areas, and adding additional devices (such as lenses) to the coupling area. In contrast to conventional research, the current invention includes the use of multiple tapers to provide coupling between optical devices.

Figure 2A:
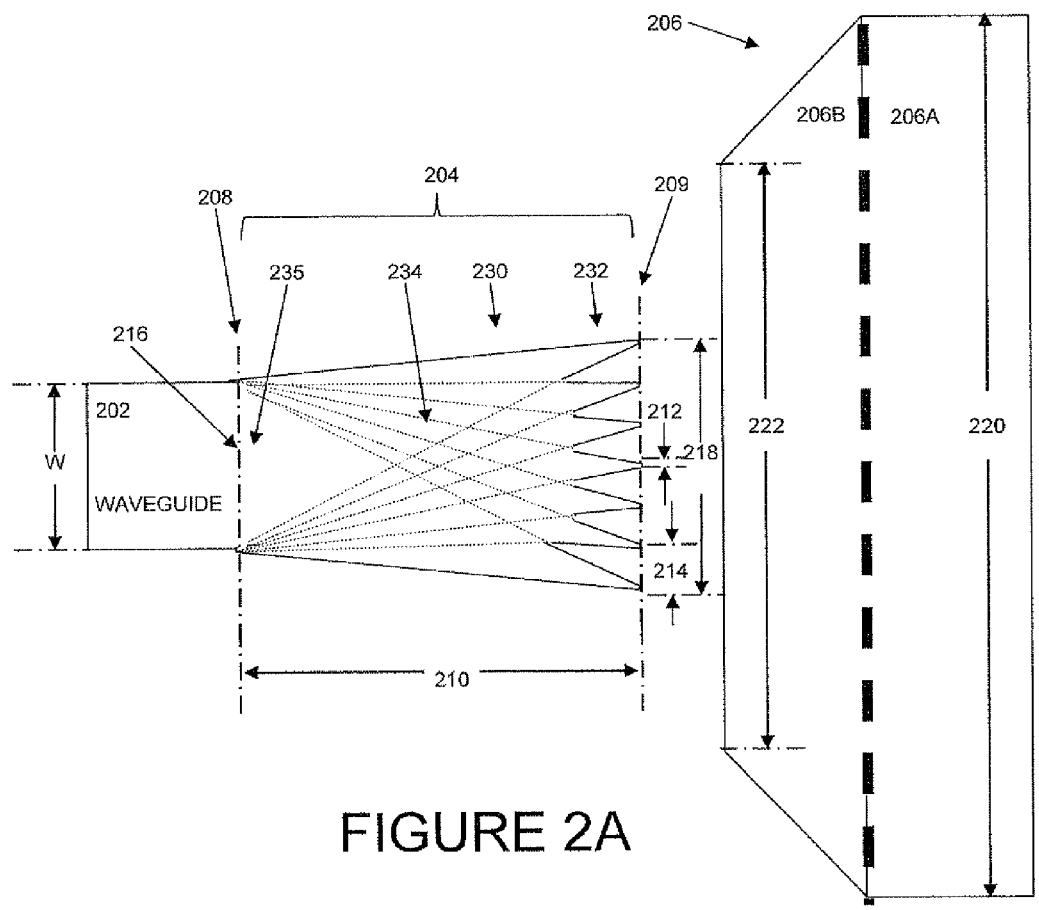
FIG. 2A is a top view of a multi-taper coupler.

Refer to FIG. 2A, a top view of a multi-taper coupler, this non-limiting example shows a "multi-taper" 204 on a waveguide 202. In the context of this document, the term "optical waveguide" generally refers to a variety of optical devices, including but not limited to optical fibers, waveguides, diodes, switches, and solar cells. The term "optical waveguide" can generally be replaced with the term "optical device", as a general term referring to a variety of products for optical transmission and receiving. Note that the current example is for clarity, as the invention is not limited to waveguides, and can be implemented on other optical devices that can transfer optical energy in both receiving and/or transmitting direction. The multi-taper can generally be used for all optical devices that transmit and/or receive optical energy. In the context of this document, optical devices include optical sources such as solar radiation, such as in the case where the multi-taper is used for collection of solar radiation. Preferably, the length and shape of all the tapers should be individually designed to fulfill the adiabatic mode conversion condition for the specific application for which the multi-taper is being used. Designing tapers for adiabatic conversion is known in the art, and further information can be found in publications such as "Nano-taper for compact mode conversion" by Vilson R. Almeida, Roberto R. Panepucci and Michal Lipson, School of Electrical and Computer Engineering, Cornell University, 2002 Optical Society of America, OCIS codes: 30.3120, 250.5300, 230.3120, 230.7380, 230.7390.

In the current non-limiting example, for a wavelength of 1550 nm the multi-taper 204 has a length 210 of 40 µm from the base end 208 of the multi-taper 204 to the distal end 209 of the tapers 230. For clarity, each of the tapers 230 are drawn to the show the separate taper tips 232, overlapping taper bodies 234, and overlapping taper bases 235. The taper bodies 234 of each of the tapers 230 are shown as a dashed construction line between the separate taper tips 232 and the overlapping taper bases 235 form a common base 216 at the base end 208 of the tapers 230. Note that the distal end 209 of the tapers serves as the coupling facet of the multi-taper 204. Note that the construction lines 208 and 209 are for reference purposes for the planes of the base 216 of the tapers and the coupling facet, respectively. Note that the length 210 is the distance from the base end 208 to the distal end 209, which is the length of the multi-taper 204, not the length of each taper. The taper bodies 234 and taper bases 235 are shown for clarity in understanding the operation of the embodiment, as the taper bodies 234 and taper bases 235 are constructed from the same continuous portion of material. In other words, the bodies 234 portion of the multi-taper 204 is a single piece (typically of the same material as the waveguide 202 or the fiber), with a base on the left (base 216) and seven coupling facets on the right (one coupling facet for each of the taper tips 232, the combination providing and referred to as the coupling facet 218 of the multi-taper 204. The length of each taper is determined by the specific application and the corresponding geometry of the multi-taper, as will be obvious to one skilled in the art. The base 216 of the multi-taper should preferably be substantially the same width W as the waveguide 202, in this example 450 nm. The multi-taper 204 of this non-limiting example includes seven tapers, each taper having a base 216 on the side of the base end 208, the width of each taper changing over the length 210 to a tip-width 212 of 30 nm on the distal end 209 of each taper. The distal end of each taper is also referred to in the context of this document as the taper-tip. Each taper has a separation 214 of 200 nm from the neighboring taper to avoid coupling between the distal ends of each taper. The distal end 209 of the multi-taper covers an overall width region of the tapers of more than 1.4 µm. In the context of this document, the overall width region of the tapers is also known as the "coupling area" 218.

Figures 2B, 2C:
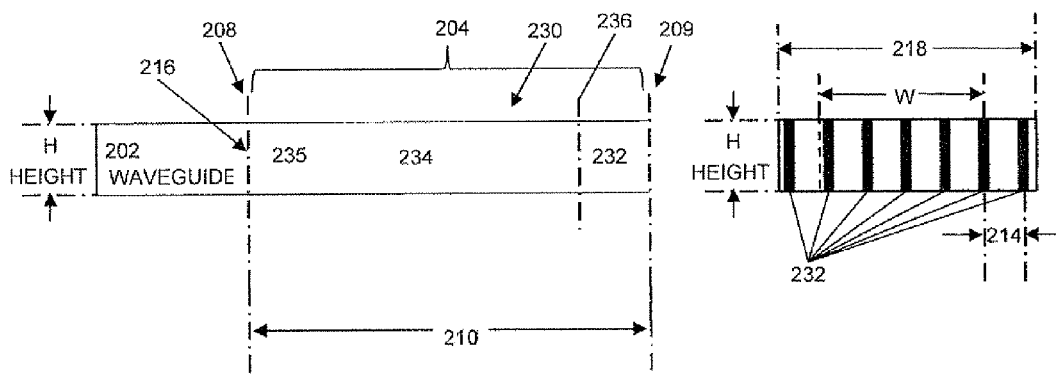
FIG. 2B is a side view of a multi-taper coupler for a waveguide.
FIG. 2C is a front view of a multi-taper coupler for a waveguide.

Refer to FIG. 2B, a side view of a multi-taper coupler for a waveguide, this view continues our current non-limiting example showing a multi-taper 204. In the top view of FIG. 2A, the waveguide 202 is viewed from above and tapering is lateral, or in other words, the width of each, taper changes (from 450 nm to 30 nm). One skilled in the art will realize that the height H of the tapers remains the same. In our non-limiting example, the height H is 220 nm. This is known in the art for design of tapers, and one skilled in the art can design the height of the tapers to facilitate desired operation of the multi-taper for a specific application. Specific implementation is described in the available literature, such as the above-cited paper by Almeida et al. In the side view, each of the tapers 230 is in parallel, so no distinguishing features are visible from the side of the multi-taper. A construction line 236 has been added to show the separation between the areas of the separate taper tips 232 and the overlapping taper bodies 234. The current figure highlights the construction of the multi-taper 204, specifically showing that the taper bodies 234 and taper bases 235 are shown in FIG. 2A for clarity in understanding the operation of the embodiment, as the taper bodies 234 and taper bases 235 are constructed from the same continuous portion of material.

Refer to FIG. 2C, a front view of a multi-taper coupler for a waveguide, this view continues our current non-limiting example showing a multi-taper 204. The taper-tips 232 are arranged substantially non-overlapping in a second plane corresponding to a coupling facet (distal end 209), and the taper-tips 232 are also arranged substantially in a single line parallel to the width W of the multi-taper 204 (width of the waveguide 202, as seen from above in FIG. 2A). As described above, the height H of each of the tapers 230 remains substantially constant, owing to the current state of the art for construction of waveguide tapers. It is foreseen that as technology improves, the height of the tapers can be adjusted from the height at the base 216 to a new height at the distal end 209, the new height based on the specifics of the application.

Given the specific application for which the multi-taper is to be used, including the wavelength(s) at which the multi-taper is to operate, one skilled in the art will be able to select the length 210 and tip-width 212 of each taper to support mode conversion. Given the width W of the waveguide 202 and the refractive index of the material (for example, silicon or glass) used for the waveguide (and hence for the multi-taper) the number of tapers can be calculated (by simple division, or using more sophisticated methods as will be apparent to one skilled in the art).

The base-end 208 corresponds to a plane in which the waveguide 202 is operationally connected to the multi-taper 204. As noted above, the dashed construction line base-end 208 is for reference. Typically, the multi-taper 204 is constructed with/from the optical waveguide, in this non-limiting example waveguide 202, and is continuous with waveguide 202. Operational connection of the waveguide 202 and the multi-taper 204 is preferably achieved by constructing the multi-taper 204 from the optical waveguide 202 portion during manufacture. Optionally, the multi-taper 204 can be operationally connected by fusing the multi-taper 204 to another optical waveguide, such as an optical fiber. Fusing a multi-taper 204 to an existing waveguide provides a very low loss connection (for as compared to other coupling methods.

Similar to the base-end 208, the distal end 209 of the tapers corresponds to a plane in which the multi-taper 204 is configured for coupling to another optical waveguide.

Figure 1A:
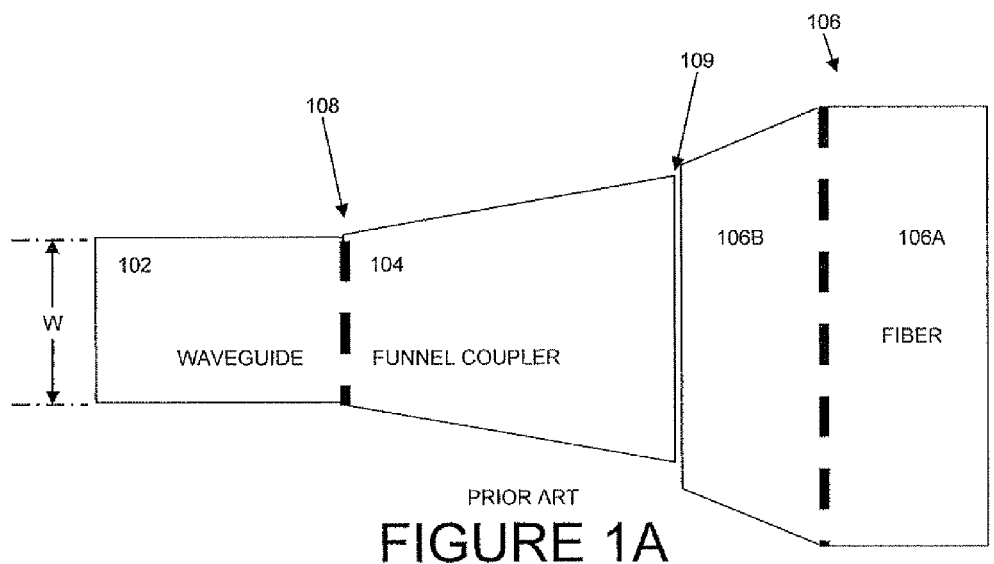
FIG. 1A is a diagram of coupling using a funnel.
Figure 1B:
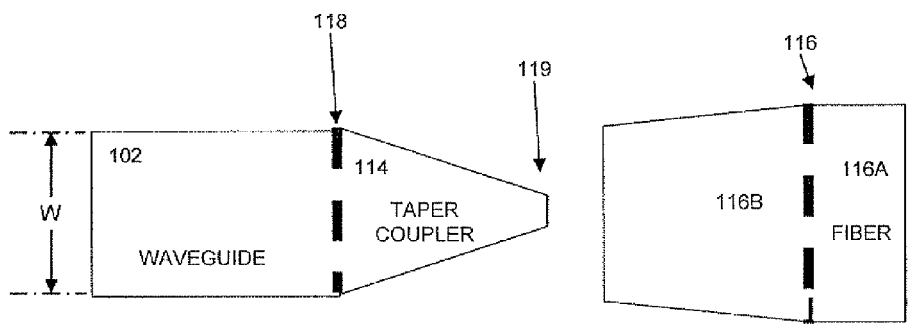
FIG. 1B is a diagram of coupling using tapering.

Similar to the conventional use of a coupler to connect to an optical fiber (as previously described in reference to FIGS. 1A and 1B, fibers 106 and 116) the multi-taper 204 can be used to couple wave guide 202 to a single-mode optical fiber 206. In this case, waveguide 202 is comparable to waveguide 102, and fiber 206 is comparable to fibers (106, 116). The fiber 206 is typically tapered from being the width of the fiber (portion 206A having width 220, for example core dimensions of 8 to 10.5 µm) to a smaller diameter (tapered portion 206B having core width 222, for example about 3 µm) as appropriate for the application and specific multi-taper coupler 204 being used.

The multi-taper 204 can also be used on both a first and second optical waveguide to connect the waveguides or fibers to each other. For example, when coupling an optical fiber to an optical fiber, both of the optical fibers can have a multi-taper, with the coupling facets of the multi-tapers providing the coupling between the optical fibers. In the case of fiber 206, the tapered fiber 206 can also be adjusted to be a multi-taper fiber, and by doing so the coupling from the multi-taper fiber to the multi-taper waveguide will have higher efficiency.

Figure 3:
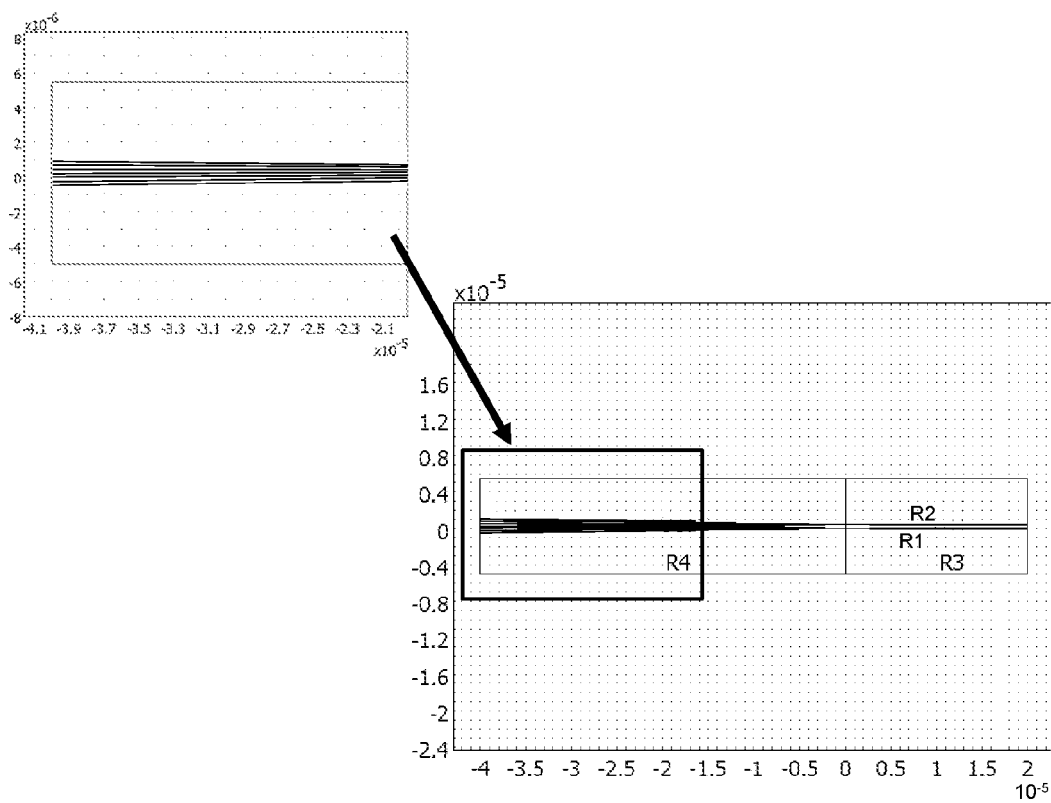
FIG. 3 is a plot of a multi-taper with seven tapers.

Referring to FIG. 3, a plot of a multi-taper with seven tapers, the size and geometry of the tapers can be seen. Note that this plot is flipped left/right from the orientation of FIG. 2A—the multi-taper base is on the right side and the coupling facet is on the left side of the plot. The lower-right plot uses a $10^{-5}$ meter scale on the x-axis and y-axis (so "1" corresponds to "10 microns"="10 μm"), while the zoomed-view in the upper-left corner uses a $10^{-6}$ scale to show the spread of the seven tapers from the base on the right to the coupling facet on the left side of the plot. The seven tapers change adiabatically from a width of 450 nm at the base of the tapers, over a distance of 40 μm, to final width of about 1.5 μm (coupling area of the coupling facet created by the separated tips of the tapers).

In the above non-limiting example using a waveguide, not only are the taper-bases 235 arranged substantially in a first plane corresponding to a base 216 of the multi-taper 204, and the taper-tips 232 arranged substantially non overlapping in a second plane corresponding to a coupling facet (distal end 209), but the taper-tips 232 are also arranged substantially in a single line parallel to the width W of the multi-taper 204 (width of the waveguide 202, as seen from above in FIG. 2A). This non-limiting example of taper-tip arrangement should not be interpreted as limiting, and other arrangements are possible depending on the application and optical waveguide(s) being coupled.

Figures 4A, 4B:
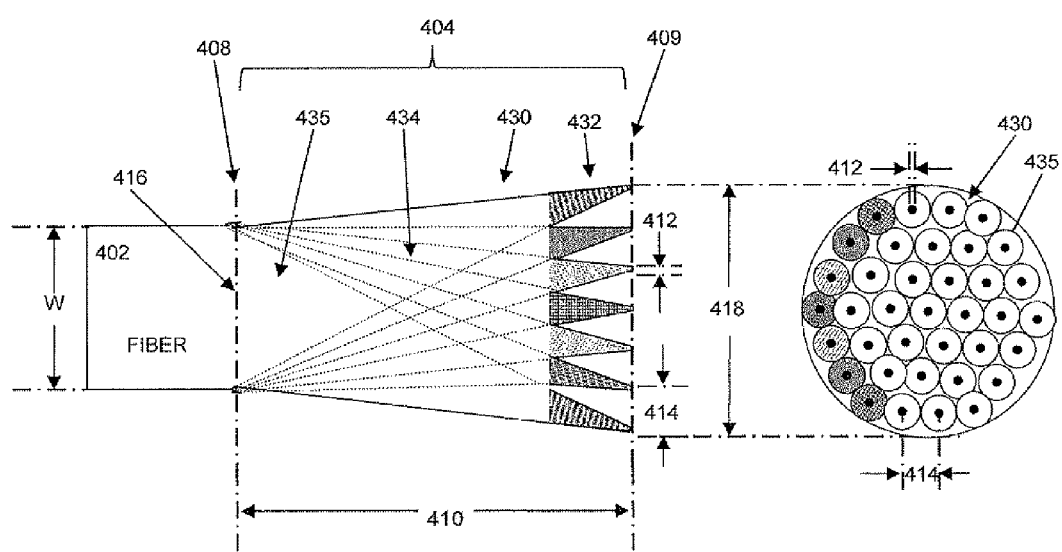
FIG. 4A is a top view diagram of a multi-taper for an optical fiber.
FIG. 4B is a front view diagram of a multi-taper for an optical fiber.

Referring to FIG. 4A and FIG. 4B, respective top view and front view diagrams of a multi-taper for an optical fiber this non-limiting example shows an embodiment of the multi-taper 404 being used with an optical waveguide that is an optical fiber 402. Note that this diagram has been simplified from FIGS. 2A-C and the clarifying internal structure used above for explanation is not shown. Similar to the above non-limiting example of a multi-taper used with a waveguide, the taper-bases 435 are again arranged substantially in a first plane shown as base end 408 and corresponding to a base 416 of the multi-taper, and the taper-tips 432 are arranged substantially non-overlapping in a second plane corresponding to a coupling facet 409, but the taper-tips are not necessarily arranged in a single line. The taper-tips 432 can be surrounded by a clad of material, such as silica, that is not surrounded by air, surrounded by different material with a different refractive index. The taper bodies 234 are shown in the current figure as common-body 434 of the multi-taper 404. The optical fiber 402 is inherently a two-dimensional structure with regard to the width W and height (not shown, equal to the width W) of the optical fiber, as opposed to the waveguide which can be considered more of a one-dimensional structure (as described above, the tapers are arranged in a line). Hence, in the case of an optical fiber, the taper-tips can be arranged in a two-dimensional plane to provide a coupling facet for the optical fiber.

Similar to FIGS. 2A-2C, the multi-taper 404 has a length 410 from the base end 408 of the multi-taper 404 to the distal end 409 of the tapers 430. Note that the distal end 409 of the tapers serves as the coupling facet of the multi-taper 404. Note that the construction lines 408 and 409 are for reference purposes for the planes of the base 416 of the tapers and the coupling facet, respectively. Note that the length 410 is the distance from the base end 408 to the distal end 409, which is the length of the multi-taper 404, not the length of each taper.

For clarity of drawing and explanation, only seven tapers are shown in FIG. 4A, although the multi-taper 404 preferably includes a multitude of tapers, as shown in FIG. 4B. Each taper has a base 416 on the side of the base end 408, the width of each taper changing over the length 410 to a tip-width 412 on the distal end 409 of each taper. The distal end 409 of each taper is also referred to in the context of this document as the taper-tip. Each taper has a separation 414 from the neighboring taper to avoid coupling between the distal ends of each taper. The distal end 409 of the multi-taper covers an overall width region that is also known as the "coupling area" 418.

In the current non-limiting example of a multi-taper for an optical fiber, the bases are shown as circles in FIG. 4B. The use of circular bases should not be interpreted as limiting, and the bases can be a variety of shapes, including, but not limited to circles, hexagons, and pentagons depending on the specific application. Based on the current description, one skilled in the art will be able to design a configuration, locations, and base-shape for the tapers.

In general, the multi-taper can be described as an optical coupler including a plurality of tapers. Each of the plurality of tapers has a taper-base with corresponding base-width and taper-tip with corresponding tip-width. The taper-bases are arranged substantially in a first plane corresponding to a base of the multi-taper. The base of the multi-taper is configured for connecting to a first optical waveguide. The taper-tips are arranged substantially non-overlapping in a second plane corresponding to a coupling facet. The coupling facet is configured for coupling with a second optical waveguide.

Preferably, the first optical waveguide is manufactured with the multi-taper connected. Alternatively, the base of the multi-taper can be operationally connected, for example fused, to the first optical waveguide.

The first or second optical waveguide can be an optical fiber, silicon on insulator (SOI) waveguide, a diode, an optical switch, a solar cell, or a similar optical device. Note that in the case where the multi-taper is used for collecting solar radiation, the base of the multi-taper is connected to the solar application (for example, thermal collector or photo-voltaic conversion) and the coupling facet is not "connected" physically to the source of solar radiation, but rather exposed to the solar radiation source, enabling the coupling facet to collect the solar radiation and communicate the collected solar radiation to the solar application.

A preferred application is the configuration and use of the tapers to convert adiabatically between a first propagation mode of an optical signal at the taper-base and a second propagation mode of the optical signal at the taper-tip. In other words, the multi-taper is configured to convert adiabatically between a first propagation mode of an optical signal at the base of the multi-taper and a second propagation mode of the optical signal at the coupling facet. Obviously, in a case where the tapers are not tapered for adiabatic conversion, the multi-taper provides non-adiabatic coupling between optical devices, as described below.

Figure 6:
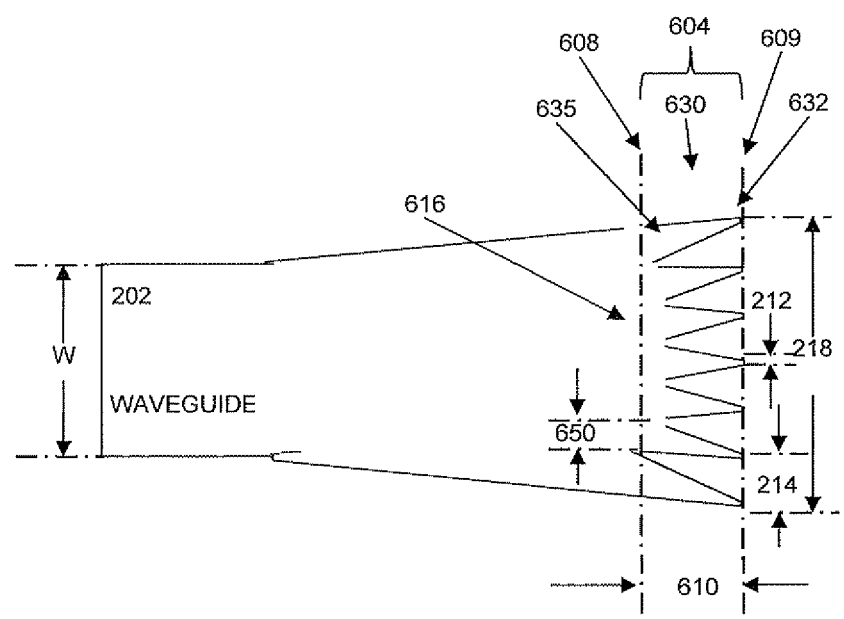
FIG. 6 is a top view of an alternative multi-taper coupler

As described in reference to FIGS. 2A-2C, the taper-bases can be approximately the width of the base-width and overlapping. In an equivalent but alternative description, the taper-bases can be smaller than the base-width and non-overlapping. Referring to FIG. 6, a top view of an alternative multi-taper coupler 604 (cf. 204), each of the alternative tapers 630 (cf. 230) has an alternative base-width 650, as compared to each of the tapers 230 that have a base-width W. The alternative bases 635 (cf. 235) are smaller than the width W of the waveguide 202, as compared to bases 235 that are substantially the same width as the waveguide. The alternative bases 635 are non-overlapping at the alternative base 616 (cf. 216), as compared with the substantially overlapping bases 216 at the base 216.

Similar to the above-described embodiments, the non-overlapping multi-taper 604 (cf 204) has a length 610 (cf. 210) from the base end 608 (cf 208) of the multi-taper 604 to the distal end 609 (cf. 209) of the tapers 630 (cf. 230). Length 610 is the distance from the base end 608 to the distal end 609, which is the length of the multi-taper 604, not the length of each of the tapers 630. The alternative taper-tips 632 (cf 432) are arranged substantially non-overlapping in a second plane corresponding to a coupling facet 609 (cf 409).

The shape of each taper and the orientation of the tapers to each other are dependent on the specific application. Different optical devices, such as waveguides, fibers, diodes, and optical switches, can benefit from a multi-taper coupler having a different configuration of tapers. Although the above non-limiting example shows trapezoidal-shaped tapers, this should not be interpreted as limiting, and other shapes can be used for the tapers, for example, tapers that are rectangular, rounded, or circular. Note, that in the case of a rectangular or similar "taper" the "taper" does not change in width over the length of the taper (in other words, the "taper" does not "taper"). In this case, the taper is not adiabatic. While a non-adiabatic taper may be less than optimal with respect to power transfer, there may be other reasons to use a non-adiabatic taper, such as providing a particular configuration of the coupling facet. Similarly, the number of tapers being used and the distance separating the tips and can be changed. Based on this description, one skilled in the art will be able to design a multi-taper, including but not limited to selection of the taper length, angle for width reduction, shape of taper tips, and orientation of the tapers, for a specific application.

Figure 5A:
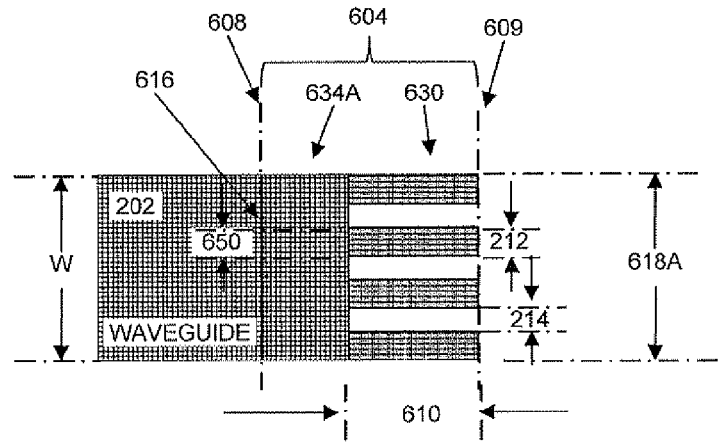
FIG. 5A is a diagram showing one implementation of rectangular tapers.
Figure 5B:
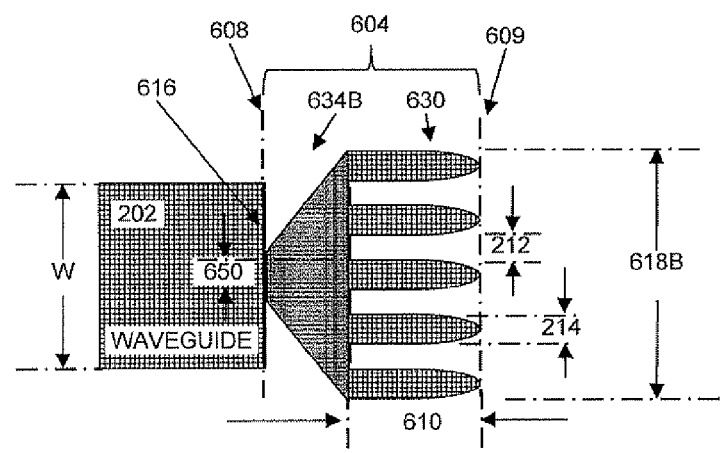
FIG. 5B is a diagram showing one implementation of oblong tapers.
Figure 5C:
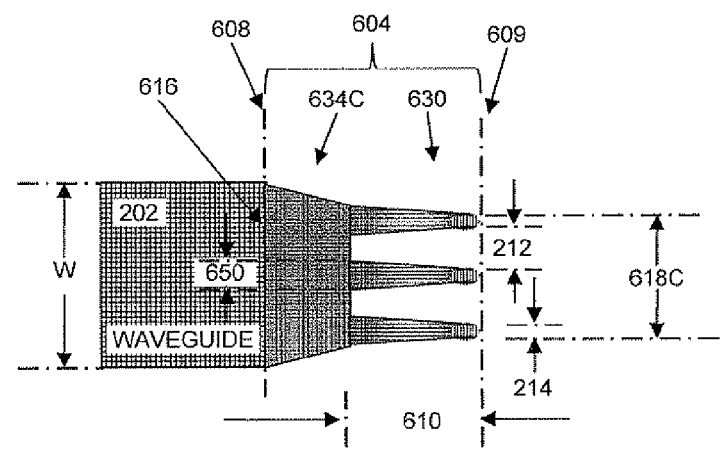
FIG. 5C is a diagram showing one implementation of rounded tapers.

Referring to FIGS. 5A, 5B, and 5C, diagrams showing respectively one implementation of rectangular, oblong, and rounded tapers, the elements are similar to the descriptions in reference to FIG. 6 for the alternative multi-taper 604.

Common-body 434 of FIG. 4 can be a variety of shapes depending on the application and the requirement and/or optimization of coupling. In FIG. 5A, a rectangular common body 634A is shown, with the resulting coupling area 618A substantially equal to the width W of the waveguide. In FIG. 5B, a funnel common body 634B is shown, increasing in size from the base end 608 of the multi-taper 604 to the distal end 609, with the resulting coupling area 618B greater than the width W of the waveguide. In FIG. 5C, a funnel common body 634C is shown, decreasing in size from the base end 608 to the distal end 609, with the resulting coupling area 618C smaller than the width W of the waveguide.

Figure 5D:
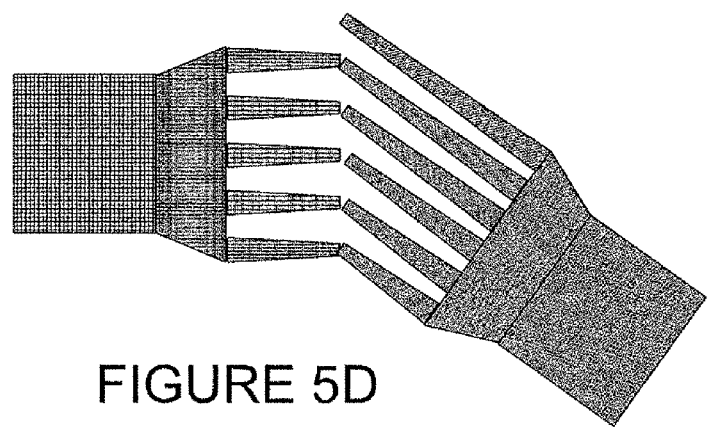
FIG. 5D is a non-limiting example diagram of coupling at an angle.

Referring to FIG. 5D, a non-limiting example diagram of coupling at an angle, one or more multi-tapers can be used at an angle to a conventional optical device or another multi-taper. In this case, the length of the tapers may need to be configured for the specific application, for example to have an angle for creating a Bragg diffraction, to provide optimum coupling.

Figure 5E:
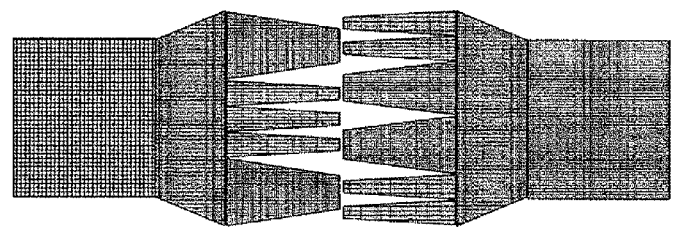
FIG. 5E is a non-limiting example diagram of different sized tapers.

Referring to FIG. 5E, a non-limiting example diagram of different sized tapers, one or more multi-tapers can have tapers of different sizes for coupling to a conventional optical device or another multi-taper.

Figure 5F:
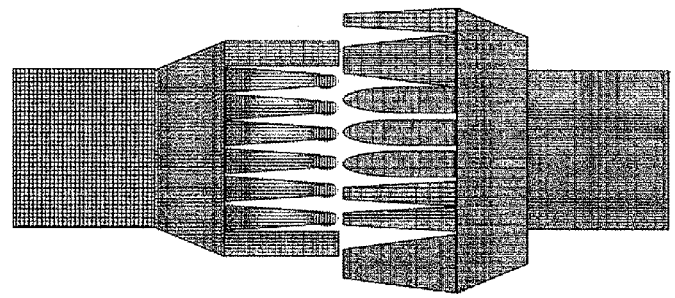
FIG. 5F is a non-limiting example diagram of different shaped tapers.

Referring to FIG. 5F, a non-limiting example diagram of different shaped tapers, one or more multi-tapers can have tapers of different shapes for coupling to a conventional optical device or another multi-taper.

The above examples are non-limiting, and other combinations are possible, for example, multiple shapes of tapers being used for coupling at an angle. It is foreseen that additional research including selection, simulation, and testing of the various parameters for implementations of the current embodiment are possible. A key feature of the current embodiment is the use of multiple tapers, and the specific implementation of the multi-taper will depend on the application to which the multi-taper is used. Based on the above description, one skilled in the art will be able to select the quantity, length, shape, angle(s), and width(s) of tapers for a specific application.

Numerical simulations are now described for the multi-taper using COMSOL multiphysics software (available from the COMSOL Group, COMSOL, Inc. 1 New England Executive Park, Suite 350, Burlington, Mass. 01803, USA, Tel: +1-781-273-3322) using RF module and TE wave. The simulations done were for coupling between a fiber and waveguide. The results should be similar for other optical couplings between devices including, but not limited to optical fibers, waveguides, and diodes. The size (width) of the end of the nano tapered tip was 30 nm (for all the tips) and the distance between the tapered tips (separation 214 at the coupling facet 209) was 200 nm (for all the distances) to obtain an adiabatic change. The parameters of the simulation include refractive index of 3.48 (silicon) surrounded by air (refractive index of 1), and the general requirements for a waveguide of electromagnetic radiation are for a flow of energy only along the guiding structure of the waveguide, and not perpendicular to the guiding structure of the waveguide.

In some of the simulations the waveguide and tapered tips were changed to have a refractive index of 1.5 and surrounded the multi-taper by silica ($SiO_2$ having a refractive index of 1.3. By changing the refractive index of the waveguide and the surroundings of the waveguide, the waveguide has a refractive index similar to a fiber (one can observe that even when the difference of the refractive index between the waveguide and the surroundings is small the proposed multi-taper is still coupling efficiently the light into the waveguide). The electric field inserted into the structure was 100 [v/m]. The wavelength is 1.5 μm and the waveguide width is 450 nm.

Figure 7A:
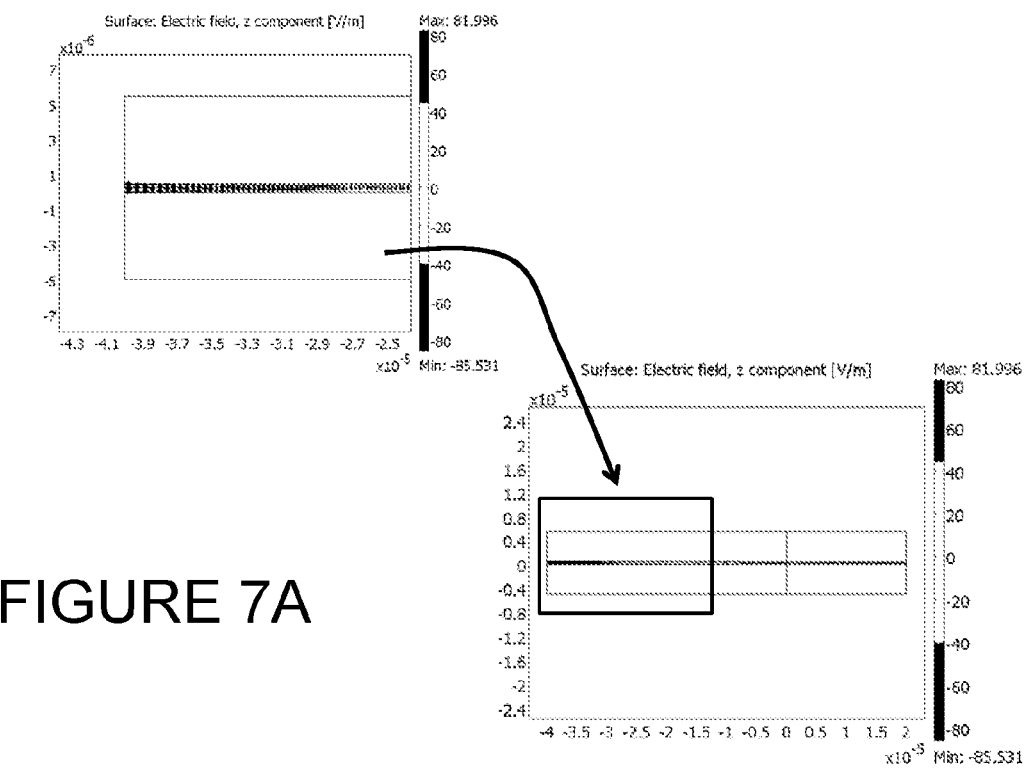
FIG. 7A is a plot of multi-taper of 3 tips

FIG. 7A is a plot of multi-taper of 3 tips. The multi-taper allows the wave to be coupled inside the waveguide. In the magnification window, the 3 tips (tapers) are coupling the wave inside the waveguide and there is a small loss of the propagating wave due to a bigger coupling area.

Figure 7B:
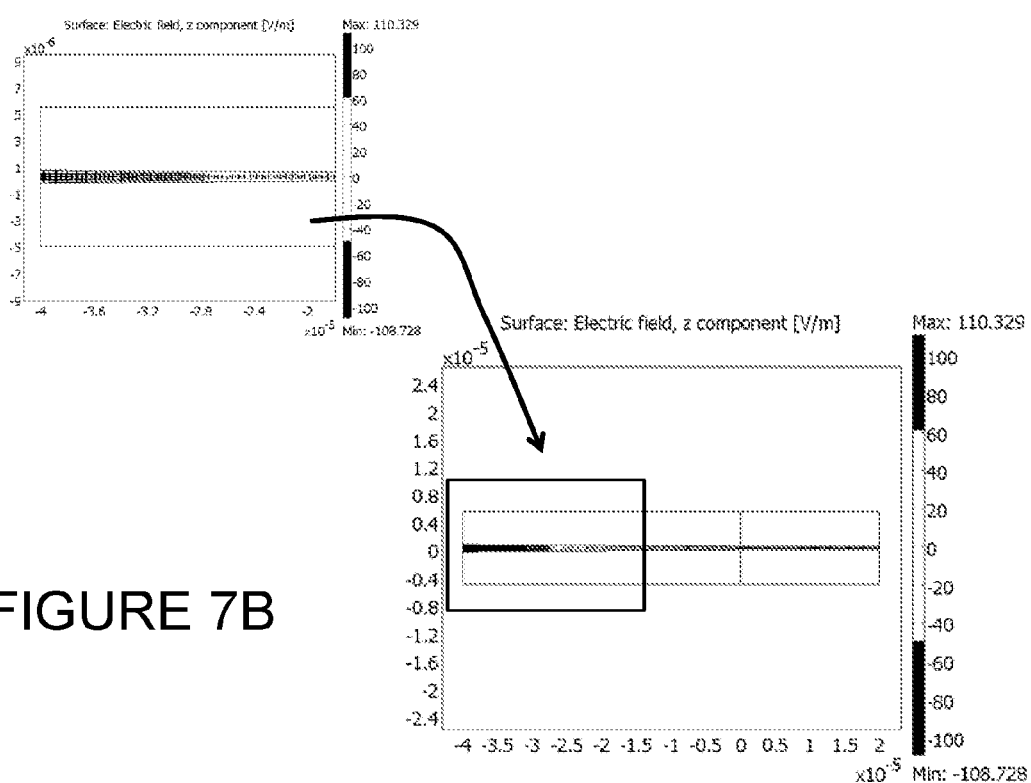
FIG. 7B is a plot of a multi-taper of 5 tips

FIG. 7B is a plot of a multi-taper of 5 tips. This multi-taper allows the wave to be coupled inside the waveguide. In the magnification window, 5 tips are coupling the wave inside the waveguide. At 5 tips, we do not see coupling losses.

Figure 7C:
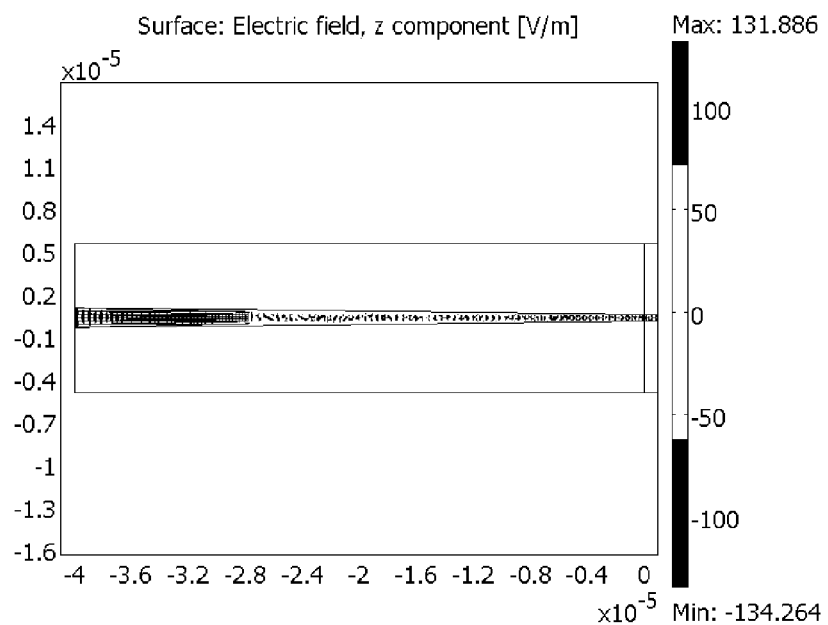
FIG. 7C is a plot of a multi-taper of 7 tips

FIG. 7C is a plot of a multi-taper of 7 tips. The multi-taper allows the wave to be coupled inside the waveguide.

Figure 7D:
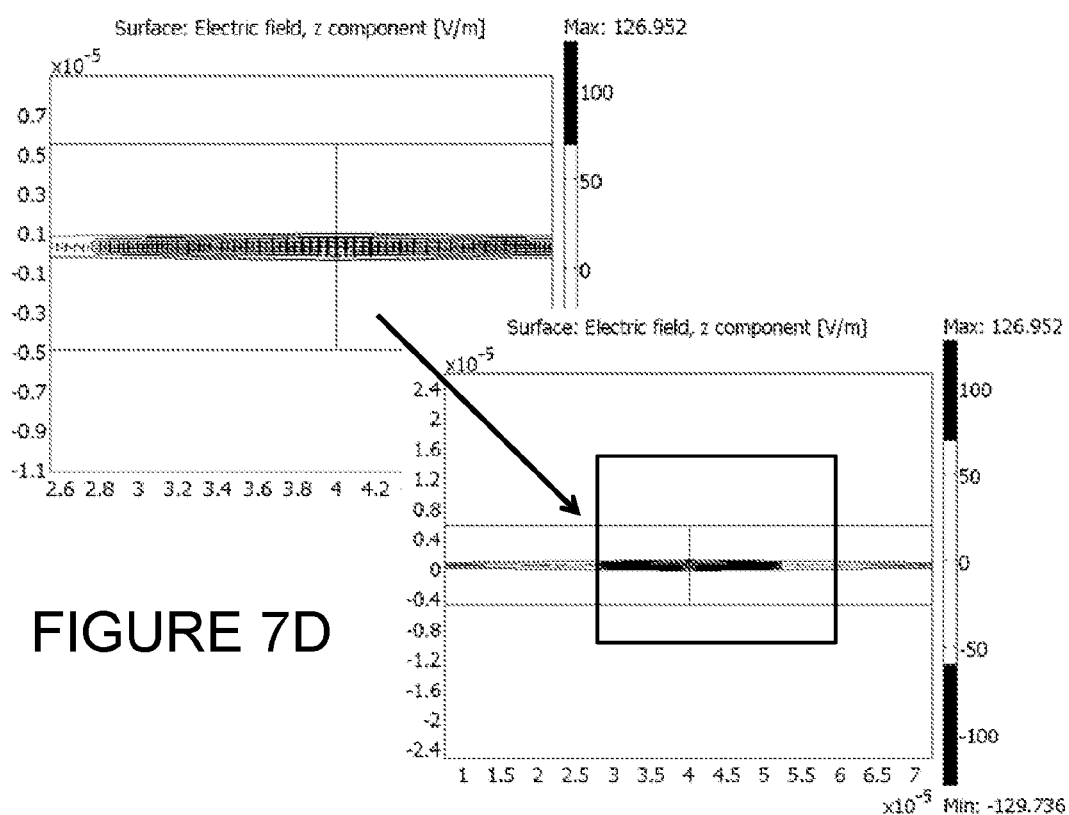
FIG. 7D is a plot of a multi-taper of 7 tips coupled to a multi-taper of 7 tips

FIG. 7D is a plot of a multi-taper of 7 tips coupled to a multi-taper of 7 tips. In the magnification window, one can see the 7 tips coupled with the 7 tips of a different waveguide, having a multi-taper at the coupling to and from the waveguide helps to not lose energy from the propagating wave at the coupling.

Figure 7E:
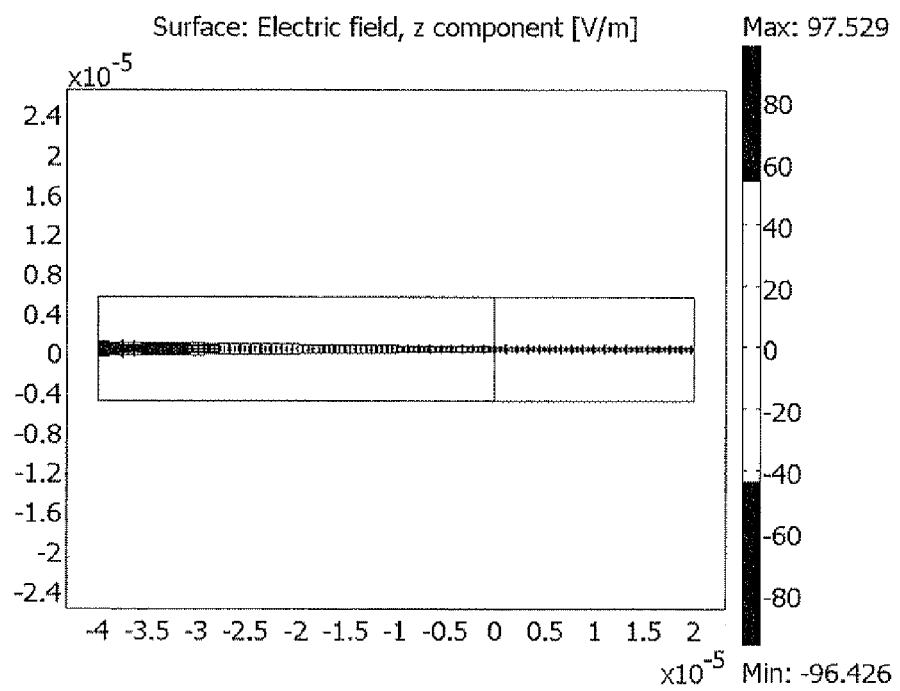
FIG. 7E is a first plot of multi-tapers of 7 tips that have a refractive index of 1.5 and surrounded by silica (SiO2 has refractive index of 1.3).
Figure 7F:
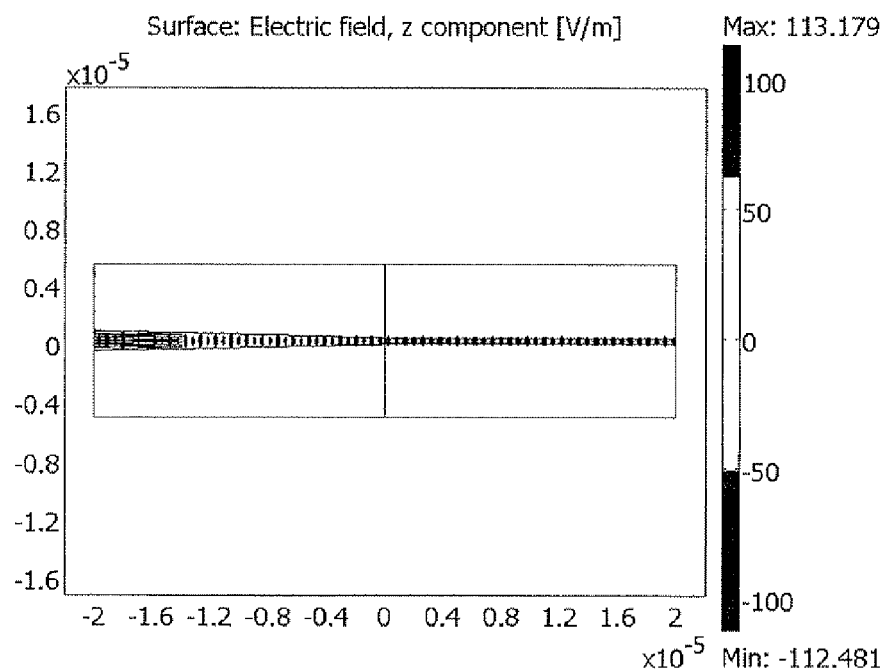
FIG. 7F is a second plot of multi-tapers of 7 tips that have a refractive index of 1.5 and surrounded by silica (SiO2 has refractive index of 1.3).

FIG. 7E and FIG. 7F are first and second plots of multi-tapers of 7 tips that have a refractive index of 1.5 and surrounded by silica ($SiO_2$ has refractive index of 1.3). Some of the energy is lost during the propagation due to the small difference between the refractive index of the waveguide and the surroundings.

Figure 7G:
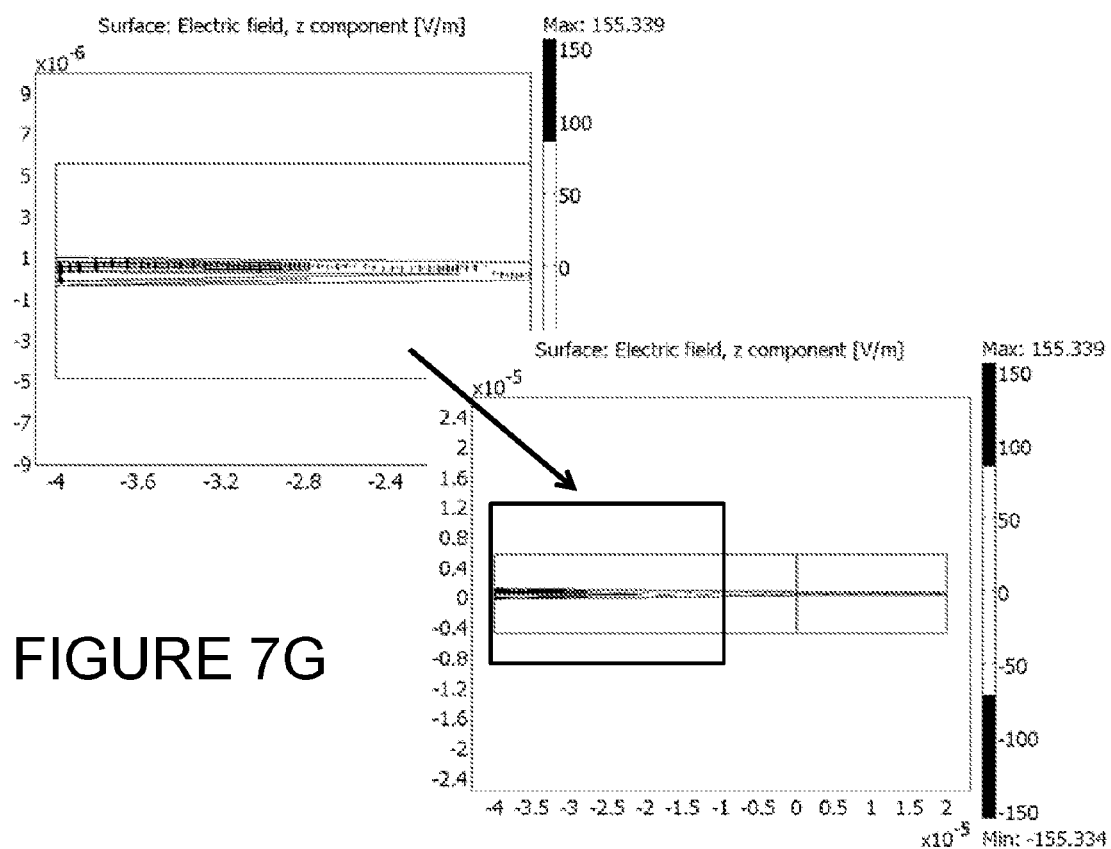
FIG. 7G is a plot of a multi-taper of 7 tips when 1 tapered tip is missing

FIG. 7G is a plot of a multi-taper of 7 tips when 1 tapered tip is missing. In the magnification window, the remaining 6 tips are coupling the wave inside the waveguide. Experimental results show an increase in gain of 2.41 dB using the multi-taper of 7 tips, as compared to using a taper with a single tip.

Figure 7H:
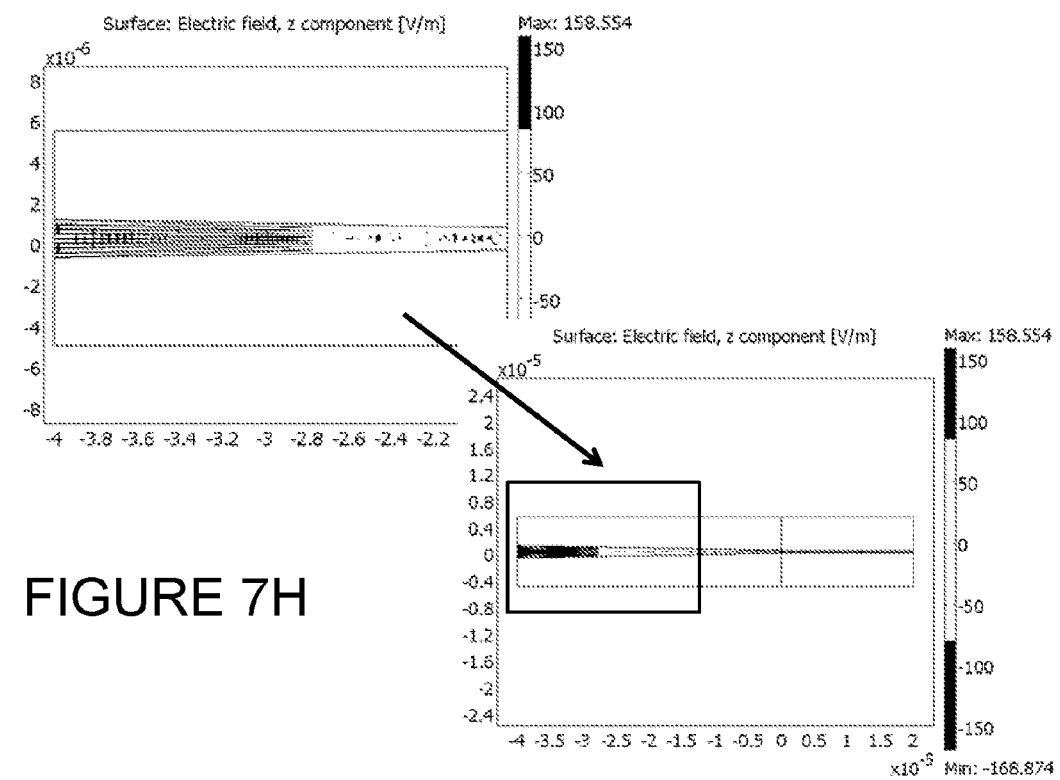
FIG. 7H is a plot of a multi-taper of 9 tips

FIG. 7H is a plot of a multi-taper of 9 tips. The multi-taper allows the wave to be coupled inside the waveguide. In the magnification window, the 9 tips are coupling the wave inside the waveguide, the facet size for coupling is more than 4 times the size of the waveguide.

Figure 7I:
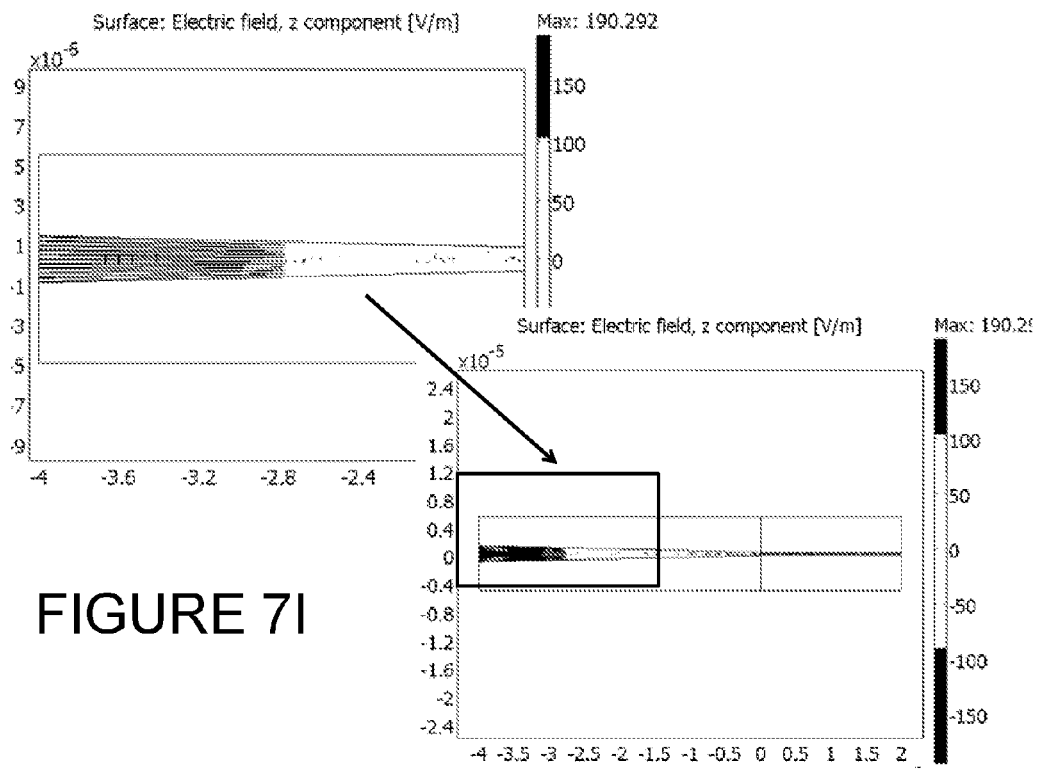
FIG. 7I is a plot of a multi-taper of 11 tips

FIG. 7I is a plot of a multi-taper of 11 tips. The multi-taper allows the wave to be coupled inside the waveguide. In the magnification window, the 11 tips are coupling the wave inside the waveguide while the facet size for coupling is more than 5 times the size of the waveguide. This increase in facet size is responsible for the obtained improvement in the energetic coupling efficiency. Experimental results show that a bigger coupling area and increased numbers of tips generate a bigger dB gain. For example: if the coupling area of a tapered fiber is 3.25 µm and the tapered fiber is coupled to a multi-taper with 15 tips having an overall coupling area of 3.25 µm the resulting gain is 4.1 dB greater than coupling the tapered fiber to a single taper. For a coupling area of 1.41 µm (that is, an overall coupling area of a multi-taper with 7 tips), the resulting gain is 2.41 dB greater than coupling the tapered fiber with a single taper.

Figure 7J:
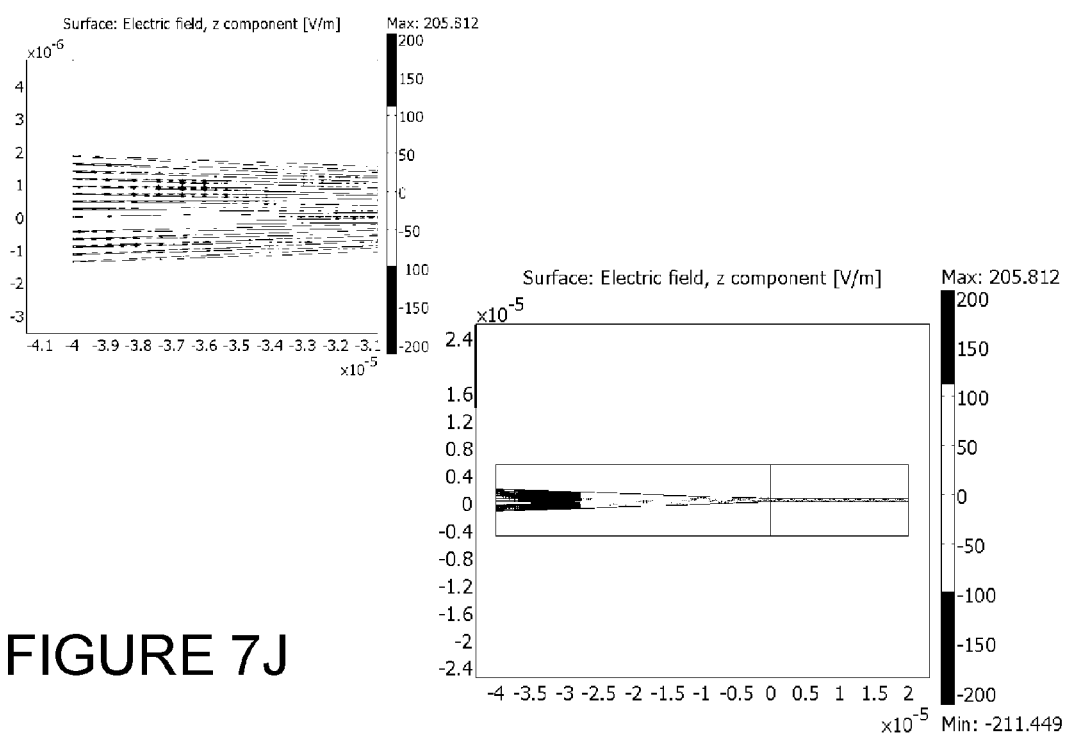
FIG. 7J is a plot of a multi-taper of 15 tips with 1 tip missing.

FIG. 7J is a plot of a multi-taper of 15 tips, with 1 tip missing. The gain is 3.759644 [w/m] on the same boundary as was checked for a multi-taper with all 15 tips. This gain is still 2.977 dB greater than the typical gain for a single taper.

A multi-taper with between three and eleven tapers has been shown to provide improved coupling compared to conventional couplers, and is a preferred implementation. Alternatively, the multi-taper can include a multitude of tapers (tapered-tips).

The choices used to assist in the description of this embodiment should not detract from the validity and utility of the invention. It is foreseen that more general choices including, but not limited to materials number of tapers, and taper configuration can be used, depending on the application.

The use of simplified calculations to assist in the description of this embodiment should not detract from the utility and basic advantages of the invention.

It should be noted that the above-described examples, numbers used, and exemplary calculations are to assist in the description of this embodiment. Inadvertent typographical and mathematical errors should not detract from the utility and basic advantages of the invention.

It will be appreciated that the above descriptions are intended only to serve as examples, and that many other embodiments are possible within the scope of the present invention as defined in the appended claims.

What is claimed is:

1. An optical coupler comprising: a plurality of tapers, each of said tapers having a taper-base and taper-tip, the taper-bases arranged substantially in a first plane to form a base of the optical coupler for connecting to a first optical device, and the taper-tips arranged substantially non-overlapping in a second plane corresponding to a coupling facet for coupling with a second optical device, wherein a width of a coupling area of said taper-tips of said plurality of tapers is greater than a width of said base of the optical coupler.

2. The optical coupler of claim 1, wherein said base is operationally connected to said first optical device.

3. The optical coupler of claim 2, wherein said first optical device is selected from the group consisting of:
(a) an optical fiber;
(b) a silicon on insulator (SOI) waveguide;
(c) a diode;
(d) an optical switch; and
(e) a solar cell.

4. The optical coupler of claim 1, wherein the taper-bases are substantially exactly overlapping.

5. The optical coupler of claim 1, wherein the taper-bases are substantially non-overlapping.

6. The optical coupler of claim 5, wherein said width of a coupling area of said taper-tips of said plurality of tapers is greater than a width of said taper-bases.

7. The optical coupler of claim 1, wherein each of said tapers is configured to convert adiabatically between a first propagation mode of an optical signal at said taper-base and a second propagation mode of said optical signal at said taper-tip.

8. The optical coupler of claim 1, wherein said optical coupler is configured to convert adiabatically between a first propagation mode of an optical signal at said base and a second propagation mode of said optical signal at said coupling facet.

9. The optical coupler of claim 1, comprising between three and eleven said tapers.

10. The optical coupler of claim 1, wherein said multi-taper portion includes a multitude of tapered tips.

11. The optical coupler of claim 1, wherein said second optical device is selected from the group consisting of:
(a) an optical fiber;
(b) a silicon on insulator (SOI) waveguide; and
(c) a diode;
(d) an optical switch; and
(e) a solar cell.

12. A method for optically coupling between a first optical device and a second optical device, the method comprising:
(a) providing optical coupler including a plurality of tapers, each of said tapers having a taper-base and taper-tip, the taper-bases arranged substantially in a first plane to form a base of the optical coupler for connecting to a first optical device, and the taper-tips arranged substantially non-overlapping in a second plane corresponding to a coupling facet for coupling with a second optical device, wherein a width of a coupling area of said taper-tips of said plurality of tapers is greater than a width of said base of the optical coupler;
(b) connecting operationally said base to said first optical device; and
(c) connecting operationally said coupling facet to said second optical device.

13. The method of claim 12, wherein said width of a coupling area of said taper-tips of said plurality of tapers is greater than a width of said taper-bases.

* * * * *